(12) United States Patent
Massimino

(10) Patent No.: US 8,989,432 B2
(45) Date of Patent: Mar. 24, 2015

(54) SYSTEM AND METHOD OF ADDING A WATERMARK TO A JPEG IMAGE FILE

(75) Inventor: Pascal Massimino, Orsay (FR)

(73) Assignee: Google Inc., Mountain View, CA (US)

( * ) Notice: Subject to any disclaimer, the term of this patent is extended or adjusted under 35 U.S.C. 154(b) by 301 days.

(21) Appl. No.: 13/435,850

(22) Filed: Mar. 30, 2012

(65) Prior Publication Data

US 2013/0259292 A1 Oct. 3, 2013

(51) Int. Cl.
*G06T 1/00* (2006.01)
(52) U.S. Cl.
CPC .................................. *G06T 1/0035* (2013.01)
USPC .......................................................... 382/100
(58) Field of Classification Search
None
See application file for complete search history.

(56) References Cited

U.S. PATENT DOCUMENTS 6,643,382 B1 * 11/2003 Maeda ........................... 382/100
2010/0046606 A1 * 2/2010 Celik et al. ................ 375/240.01

OTHER PUBLICATIONS

Fridrich et al. "Invertible Authentication Watermark for JPEG Images." Proceedings of the International Conference on Information Technology, Apr. 2001, pp. 223-227.*
JPEG Standard, Standford University, handout for course EE398A Image and Video Compression, downloaded from, "http://www.stanford.edu/class/ee398a/handouts/lectures/08-JPEG.pdf" on Mar. 22, 2014.*
Iwata et al. "Digital Watermarking Method for Tamper Detection and Recovery of JPEG Images." International Symposium on Information Theory and its Applications, Oct. 17, 2010, pp. 309-314.*
Wong et al. "A Blind Watermarking Technique in JPEG Compressed Domain." Proceedings of the International Conference on Image Processing, vol. 3, Jun. 24, 2002, pp. 497-500.*
Chen et al. "A Robust Oblivious Watermarking Technique." International Computer Symposium, Dec. 16, 2010, pp. 44-47.*
Kung et al. "Watermark Technique Using Frequency Domain." 14th International Conference on Digital Signal Processing, vol. 2, 2002, pp. 729-731.*
Chang et al. "A Steganographic Method Based upon JPEG and Quantization Table Modification." Information Sciences, 141 (2002), pp. 123-138.*
"Key (Cryptography)", downloaded from http://en.wikipedia.org/wiki/Key_(cryptography) on Mar. 28, 2012 (3 pages).
"Symmetric-Key Algorithm", downloaded from http://en.wikipedia.org/wiki/Symmetric-key_algorithm on Mar. 28, 2012 (2 pages).
"Advanced Encryption Standard", downloaded from http://en.wikipedia.org/wiki/Advanced_Encryption_Standard on Mar. 28, 2012 (10 pages).
"JPEG—Idea and Practice/The Header Part", downloaded from http://en.wikibooks.org/wiki/JPEG_-Idea_and-Practice/The_header-part on Mar. 28, 2012 (5 pages).

(Continued)

*Primary Examiner* — Jon Chang
(74) *Attorney, Agent, or Firm* — McDermott Will & Emery LLP

(57) ABSTRACT

A plurality of signature bits to be used to generate a watermark in a JPEG image file is determined, wherein the JPEG image file comprises at least one quantization table. A plurality of locations in the at least one quantization table is selected. A respective value associated with each of the selected plurality of locations in the at least one quantization table is changed, based on the plurality of signature bits.

16 Claims, 16 Drawing Sheets

(56) References Cited

OTHER PUBLICATIONS

"JPEG", downloaded from http://en.wikipedia.org/wiki/JPEG on Mar. 28, 2012 (30 pages).

"Terminal Equipment and Protocols for Telematic Services", International Telecommunication Union, Sep. 1992 (182 pages).

* cited by examiner

SYSTEM AND METHOD OF ADDING A WATERMARK TO A JPEG IMAGE FILE

TECHNICAL FIELD

This specification relates generally to systems, methods and apparatus for manipulating a Joint Photographic Experts Group (JPEG) image file, and more particularly to systems, methods and apparatus for adding a watermark to a JPEG image file.

BACKGROUND

The term "JPEG" is an acronym for the Joint Photographic Experts Group, the name of the committee that created the JPEG standard.

JPEG image files are compressed using the JPEG compression scheme. Images captured by digital cameras are often saved as JPEG image files. Additionally, photographic images stored and transmitted on the World Wide Web are often in JPEG format.

JPEG images may additionally be watermarked. Techniques for adding a watermark to a digital image are used for a variety of purposes. For example, the owner of an image may wish to inform any user of the owner's identity for advertising or commercial purposes. Watermarking may also be used as a tool to protect the owner's intellectual property rights in the image. Existing systems and methods used to add a watermark to a JPEG image file typically require the JPEG image file to be decoded, watermarked, and then re-encoded before being provided to a user.

BRIEF SUMMARY

In accordance with an embodiment, a method of watermarking an encoded image is provided. A plurality of signature bits to be used to generate a watermark in a JPEG image file is determined, wherein the JPEG image file comprises at least one quantization table. A plurality of locations in the at least one quantization table is selected. A respective value associated with each of the selected plurality of locations in the at least one quantization table is changed, based on the plurality of signature bits.

In another embodiment, changing a respective value associated with each of the selected plurality of locations in the quantization table, based on the plurality of signature bits further comprises changing a bit in a selected position of a binary representation of the respective value to be equal to a corresponding one of the plurality of signature bits.

In another embodiment, the JPEG image file comprises a first quantization table and a second quantization table, and the plurality of locations are selected from the first quantization table.

In another embodiment, the first quantization table and the second quantization table comprise a quantization table associated with a luminance channel and a quantization table associated with a chrominance channel.

In another embodiment, the first quantization table comprises the quantization table associated with the luminance channel and the second quantization table comprises the quantization table associated with the chrominance channel.

In another embodiment, a second plurality of locations in the second quantization table is selected. A respective value associated with each of the selected second plurality of locations in the quantization table is changed, based on the plurality of signature bits.

In another embodiment, the quantization table comprises a first set of values associated with low frequency components of a signal. Selecting the plurality of locations in the quantization table further comprises selecting locations in the quantization table from among the first set of values associated with low frequency components of the signal.

In another embodiment, the selected position of the binary representation of the respective value comprises a second least significant bit of the binary representation of the respective value.

In another embodiment, one or more encoded Fourier coefficients in a payload of the JPEG image file are re-quantized, after the respective values associated with the selected plurality of locations in the quantization table are changed.

These and other advantages of the invention will be apparent to those of ordinary skill in the art by reference to the following detailed description and the accompanying drawings.

BRIEF DESCRIPTION OF THE DRAWINGS

FIG. 13A shows a quantization table in accordance with an embodiment;

FIG. 14A shows a binary representation of a value in a quantization table in accordance with an embodiment;

FIG. 14B shows a binary representation of a modified value in the quantization table in accordance with an embodiment;

DETAILED DESCRIPTION

JPEG is a method of "lossy" compression for digital pictures. JPEG is a data encoding method that compresses data by discarding some data. Using JPEG, the degree of compression can be adjusted so that less storage space is used by sacrificing image quality.

A codec is a device or computer program capable of encoding or decoding a digital data stream or signal. The JPEG standard specifies the codec defining how an image may be compressed and decompressed. JPEG compression is suitable for photographs and paintings of realistic scenes with smooth variations of tone and color. JPEG compression may be used for any image files. JPEG compression has become widely used on the World Wide Web where the amount of data used for an image may be important, especially in circumstances where a user may be on a low-bandwidth connection or on a mobile device.

Figure 6:
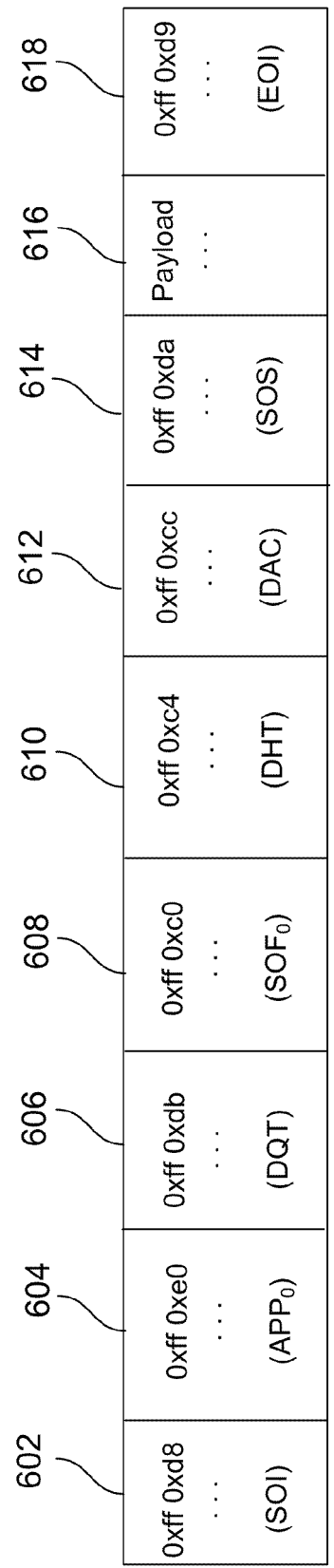
FIG. 6 shows the structure of a JPEG image file in accordance with an embodiment.

FIG. 6 shows a structure of JPEG image file 600 in accordance with an embodiment. A JPEG image file includes one or more tables including one or more quantization and Huffman tables. A quantization table represents a plurality of quantized coefficients. A default Huffman table is provided in the JPEG image file.

Structure of JPEG image file 600 may include multiple markers. The markers refer to actual bytes in the JPEG image. As depicted in FIG. 6, a start of image (SOI) marker 602 is indicated by "0xff 0xd8." Maker 602, indicated by "0xff 0xd8" refers to the actual bytes in the file. SOI marker 602 marks the start of a compressed image represented in the interchange format or abbreviated format.

An application ($App_0$) marker 604 is indicated by "00xff 0xe0." $App_0$ marker 604 marks the beginning of an application data segment.

A define quantization table (DQT) marker 606 is indicated by "0xff 0xdb." DQT marker 606 marks the beginning of one or more quantization table-specification parameters.

A start of frame ($SOF_0$) marker 608 is indicated by "0xff 0xc0." $SOF_0$ marker 608 marks the beginning of the frame parameters. The subscript "0" identifies whether the encoding process is baseline sequential, extended sequential, progressive, or lossless, as well as which entropy encoding procedure is used. "N" subscripts may be used.

A define Huffman table (DHT) marker 610 is indicated by "0xff 0xc4." DHT marker 610 marks the beginning of Huffman table definition parameters.

A define arithmetic coding conditioning(s) (DAC) marker 612 is indicated by "0xff 0xcc." SOS marker 614 is indicated by "0xff 0xda." A define arithmetic coding conditioning(s) (DAC) marker 612 marks the beginning of the definition of arithmetic coding conditioning parameters.

Payload marker 616 includes the payload. The payload includes data related to the image file.

An end of image (EOI) marker 618 is indicated by "0xff 0xd9." EOI marker 618 marks the end of a compressed image represented in the interchange format or abbreviated format.

Data may be included in each of these markers, indicated by " . . . " Other markers (not shown) may be included. Each of these markers may be two bytes in size and may be followed by data and/or a payload.

As shown in FIG. 6, DHT marker 610 comprises a Huffman table chunk. Two bytes specify the length of the payload (e.g. in little-endian format, where the least significant byte is stored first), including two bytes for the size. DHT marker 610 0xff 0xc4 shows an example of a Huffman table chunk indicating two bytes and may be followed by a payload (indicated by " . . . ").

A cipher is an algorithm (a series of steps) that encrypts or decrypts data. A cipher can be used to encrypt data (e.g. plaintext of the original information, etc.) into an encrypted form called ciphertext. A key can be an essential piece of information used by a cipher. A key can be used to vary the encryption process by changing the operation of the algorithm. Importantly, the key must be selected before a cipher can encrypt a message. Otherwise, it may be impossible to decrypt the resulting ciphertext into plaintext.

Symmetric-key algorithms are one type of algorithm used in cryptography. Symmetric-key algorithms utilize cryptographic keys which are trivially related, or identical, for both encryption of plaintext and decryption of ciphertext. The key represents a shared secret between two or more parties that can be used to maintain a private information link.

Examples of symmetric algorithms include Twofish, Serpent, AES (Rijndael), Blowfish, CAST5, RC4, 3DES, and IDEA. Notably, Advanced Encryption Standard (AES) is a specification for the encryption of electronic data.

Asymmetric-key algorithms allow one key to be made public while keeping a secret private key in only one location. Even if the corresponding public key is known, the private key is kept secret. A user of public key technology may publish their public key, while keeping their private key secret, allowing anyone to send them an encrypted message.

Figure 1:
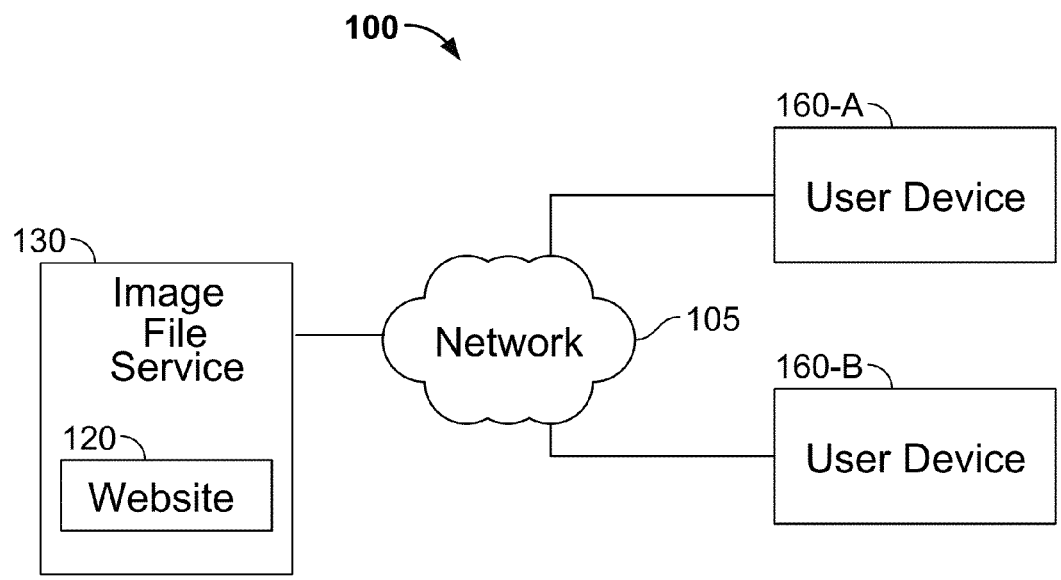
FIG. 1 shows a communication system in accordance with an embodiment.

FIG. 1 shows a communication system 100, according to an embodiment. Communication system 100 includes a user device 160-A, a user device 160-B, and an image file service 130. For convenience, the term "user device 160" is used herein to refer to any one of user devices 160-A, 160-B, etc. Accordingly, any discussion herein referring to "user device 160" is equally applicable to each of user devices 160-A, 160-B, etc. Communication system 100 may include more or fewer than two user devices. These devices and/or servers communicate with each other using network 105.

In the exemplary embodiment of FIG. 1, network 105 is the Internet. In other embodiments, network 105 may include one or more of a number of different types of networks, such as, for example, an intranet, a local area network (LAN), a wide area network (WAN), a wireless network, a Fibre Channel-based storage area network (SAN), or Ethernet. Other networks may be used. Alternatively, network 105 may include a combination of different types of networks.

Image file service 130 maintains, stores, and makes available to users, a plurality of JPEG image files. Image file service 130 may maintain a website 120 which may be used by users to access the JPEG image files. Website 120 may be hosted on image file service 130 or may be hosted externally (not shown). Image file service 130 may comprise one or more servers. Therefore, the term server is used herein to describe a server within image file service 130.

Figure 2:
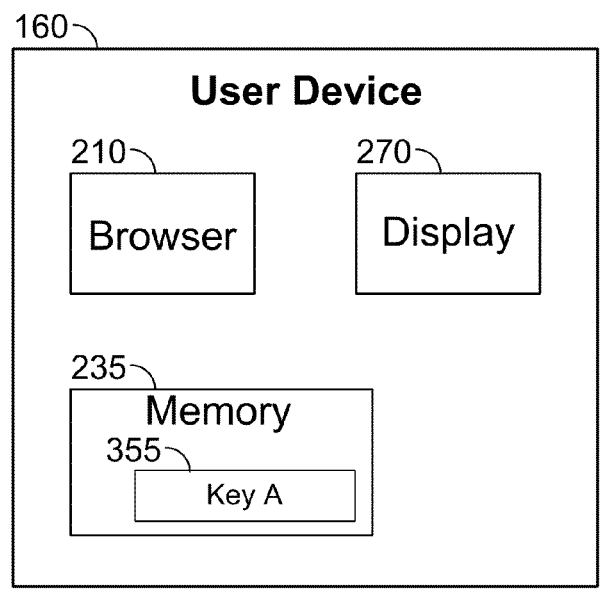
FIG. 2 shows functional components of an exemplary user device in accordance with an embodiment.

FIG. 2 shows functional components of user device 160 in accordance with an embodiment. User device 160 includes a browser 210 and a display 270. Browser 210 may be a conventional web browser used to access World Wide Web sites via the Internet, for example. Display 270 displays webpages, images and other information. For example, a user employing user device 160 may use display 270 to view website 120 and access a plurality of JPEG image files.

User device 160 also includes memory a 235. Memory 235 stores a key A 355.

Figure 3:
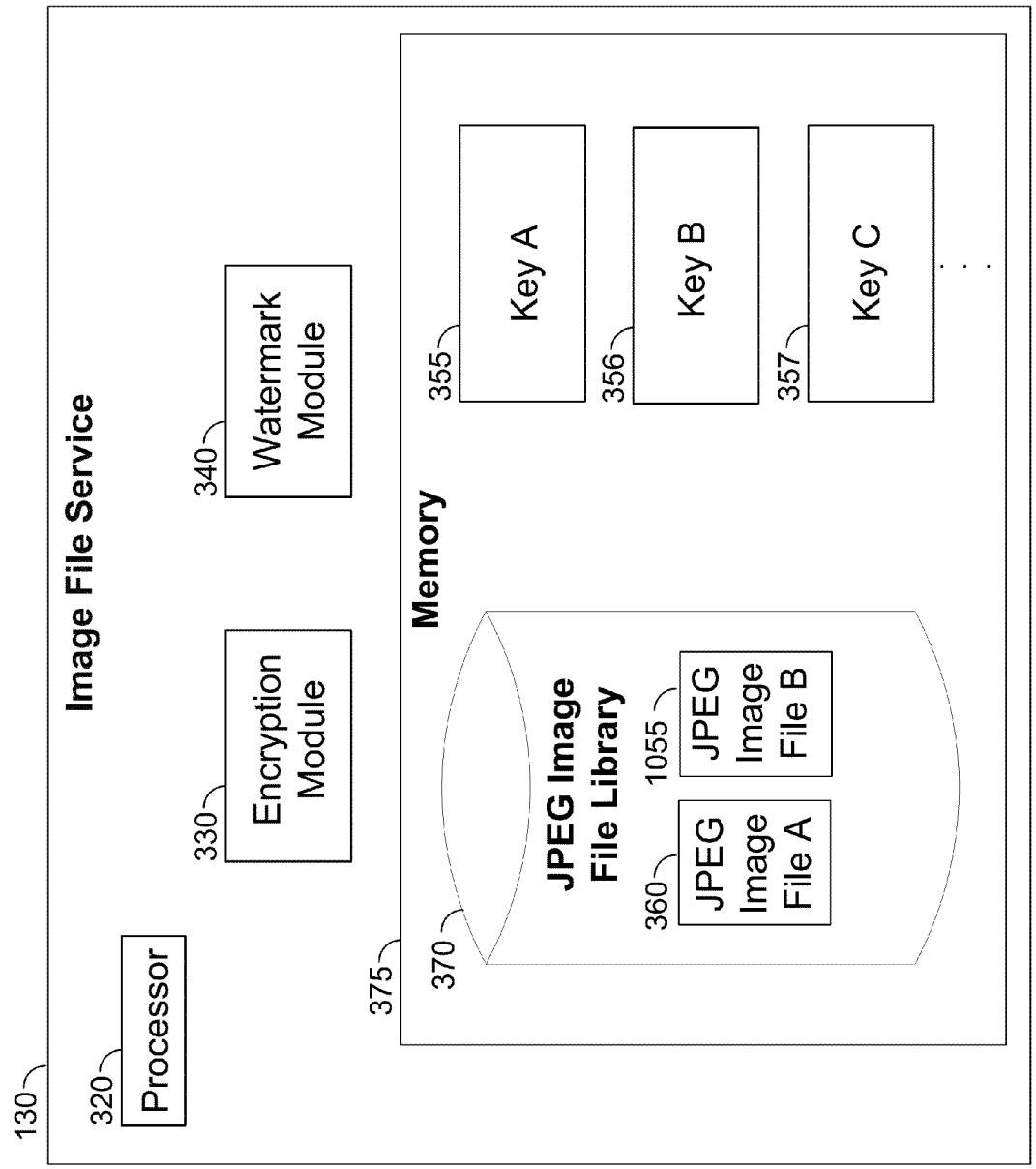
FIG. 3 shows functional components of an exemplary image file service in accordance with an embodiment.

FIG. 3 shows functional components of image file service 130 in accordance with an embodiment. Image file service 130 includes a processor 320, an encryption module 330, a watermark module 340, and a memory 375. Image file service 130 may include other components not shown in FIG. 3.

The terms "JPEG image file" and "image file" are used herein to refer to image files that are encoded using JPEG.

In an exemplary embodiment, a plurality of JPEG image files are stored in image file service 130 within memory 375. For example, memory 375 includes a database for storing the JPEG image files. A JPEG image file library 370 stores a JPEG image file A 350 and a JPEG image file B 1055. JPEG image file library 370 may store any number of image files. In an alternative embodiment, JPEG image files may be stored in external memory located remote from image file service 130.

Memory 375 further stores one or more keys. Memory 375 may store key A 355, a key B 356, and a key C 357.

Figure 4:
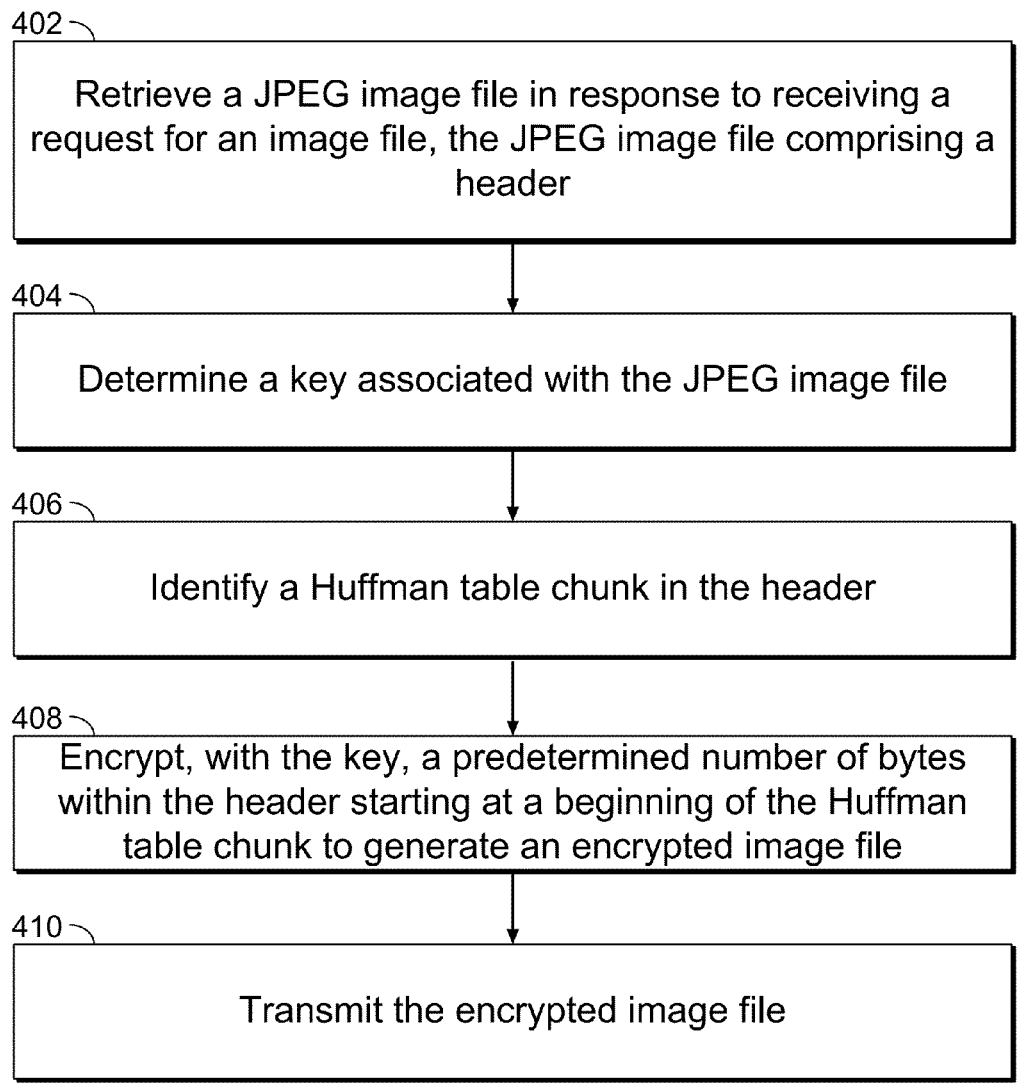
FIG. 4 is a flowchart for a method of encrypting a JPEG image file in accordance with an embodiment.

FIG. 4 is a flowchart for a method of encrypting a JPEG image file in accordance with an embodiment. At step 402, a JPEG image file is retrieved in response to receiving a request for an image file. The JPEG image file comprises a header. Image file service 130 retrieves JPEG image file (for example, JPEG image file A 360), from JPEG image file library 370, in response to receiving a request for an image file by user device 160. JPEG image file A 360 comprises a header.

At step 404, a key associated with the JPEG image file is determined. Image file service 130 determines key A 355 associated with JPEG image file (JPEG image file A 360).

At step 406, a Huffman table chunk in the header is identified. Image file service 130 identifies a Huffman table chunk, in a DHT marker 610, shown in FIG. 6.

At step 408, a predetermined number of bytes within the header starting at a beginning of the Huffman table chunk are encrypted, with the key, to generate an encrypted image file. Encryption module 330 in image file service 130 encrypts, with key A 355, a predetermined number of bytes within the header, starting at the beginning of Huffman table chunk in DHT marker 610 to generate an encrypted image file. Thus, in accordance with an embodiment, the predetermined number of bytes within the header that are encrypted include a contiguous set of bytes in the header of the encrypted image file. In another embodiment, the predetermined number of bytes within the header that are encrypted include a non-contiguous set of bytes in the header of the encrypted image file.

At step 410, the encrypted image file is transmitted. Image file service 130 transmits, via network 105, the encrypted image file to user device 160, which requested the image file.

In an embodiment, an encrypted image file that is not encoded or at least partially encoded is transmitted to user device 160. User device 160 may then decrypt the image file using key A 355 and decode the image using a JPEG decoder.

In an embodiment, Huffman table chunks may be tuned for each image file by a JPEG encoder. Instead of using specified default Huffman tables, optimized Huffman tables are used and therefore, the optimized Huffman table chunks are unique to the image file and difficult to recover or reverse. The terms Huffman table and Huffman table chunks used throughout refer to the optimized Huffman table and optimized Huffman table chunks, respectively, which have been tuned for each image file by the JPEG encoder. The optimized Huffman table and optimized Huffman table chunks have been manipulated.

In default Huffman tables, pre-defined codes may be assigned to the symbols. In order to perform optimization of the Huffman table and Huffman table chunks, a histogram analysis of the frequency of the symbols that need to be coded in the image file is performed. Then, shorter codes may be assigned to the most frequent symbols, whereas very improbable symbols may be coded with much longer codes (e.g. bit patterns).

As depicted by FIG. 6, DHT marker comprises a Huffman table chunk. In order to locate various chunks, the two-byte marker and the two-byte size are used to jump from one chunk to another chunk until "0xff 0xc4" (the DHT marker 610) is found. In this way, there is no need to scan the entire file.

In an embodiment, the predetermined number of bytes within the header is selected from a group consisting of first sixteen bytes of the Huffman table chunk and first thirty-two bytes of the Huffman table chunk. In an embodiment, the predetermined number of bytes may include data from outside the Huffman table chunk. In an embodiment, the predetermined number of bytes (referred to at step 408) are sixteen bytes. In an embodiment, the predetermined number of bytes may be at least thirty-two bytes in size. In other embodiments, the predetermined number of bytes may be any number of bytes.

In an embodiment, the predetermined number of bytes are encrypted in real-time in response to receiving the request. The predetermined number of bytes are encrypted in real-time and/or substantially in real time by encryption module 330 using key A 355. In this way, no global preprocessing is needed as the encryption is performed in real-time. Encryption module 330 may comprise a server to encrypt or cipher the predetermined number of bytes.

In an embodiment, key A 355 is generated on the fly and stored in memory 375. In another embodiment, key A 355 is predetermined and stored in memory 375 and allocated to cipher or encode the predetermined number of bytes within the header starting at a beginning of the Huffman table chunk.

Image file service 130 may perform authentication of user device 160 prior to submitting key A 355 to user device 160. In an embodiment, user device 160 may log into image file service 130 and/or a server associated with image file service 130. A user employing user device 160 may provide credentials, such as a user name, email address, alias and/or other login name as well as a password. Image file service 130 may authenticate the user and the user may then log into a service for providing JPEG image files provided by image file service 130.

Should image file service 130 be unable to authenticate the user (for example, after a predetermined amount of failed log in attempts), image file service 130 may lock out the user's account from logging into the JPEG image file service for a period of time or until the user's account and password restored. Restoring the user's account and password may require a series of steps. For example, image file service 130 may require the user to enter personal information, answers to preset questions, answers to customized questions created by the user when creating the user account, or other information into an interface. Image file service 130 may require the user to use a secondary device to ensure the user is authorized to access the user account. For example, the user may be required to communicate with authentication services and/or password resetting services provided by image file service 130 (e.g. by voice or text) using a telephone and/or mobile phone. After the user account is restored and/or the password is reset, the user may return to image file service 130 and attempt to re-login to the service in order to receive JPEG image files. In response to authenticating the user device, image file service 130 transmits the key (key A 355) to the user device. In an embodiment, the key is made available to the user device using a side secure channel, possibly at a different time than the transmission of the encrypted JPEG image file, either before or after the transmission of the JPEG image file. The key may be transmitted using cookies and any other session identifiers. In an alternate embodiment, the key may be transmitted to the user device at substantially the same time as transmission of the JPEG image file.

Figure 5:
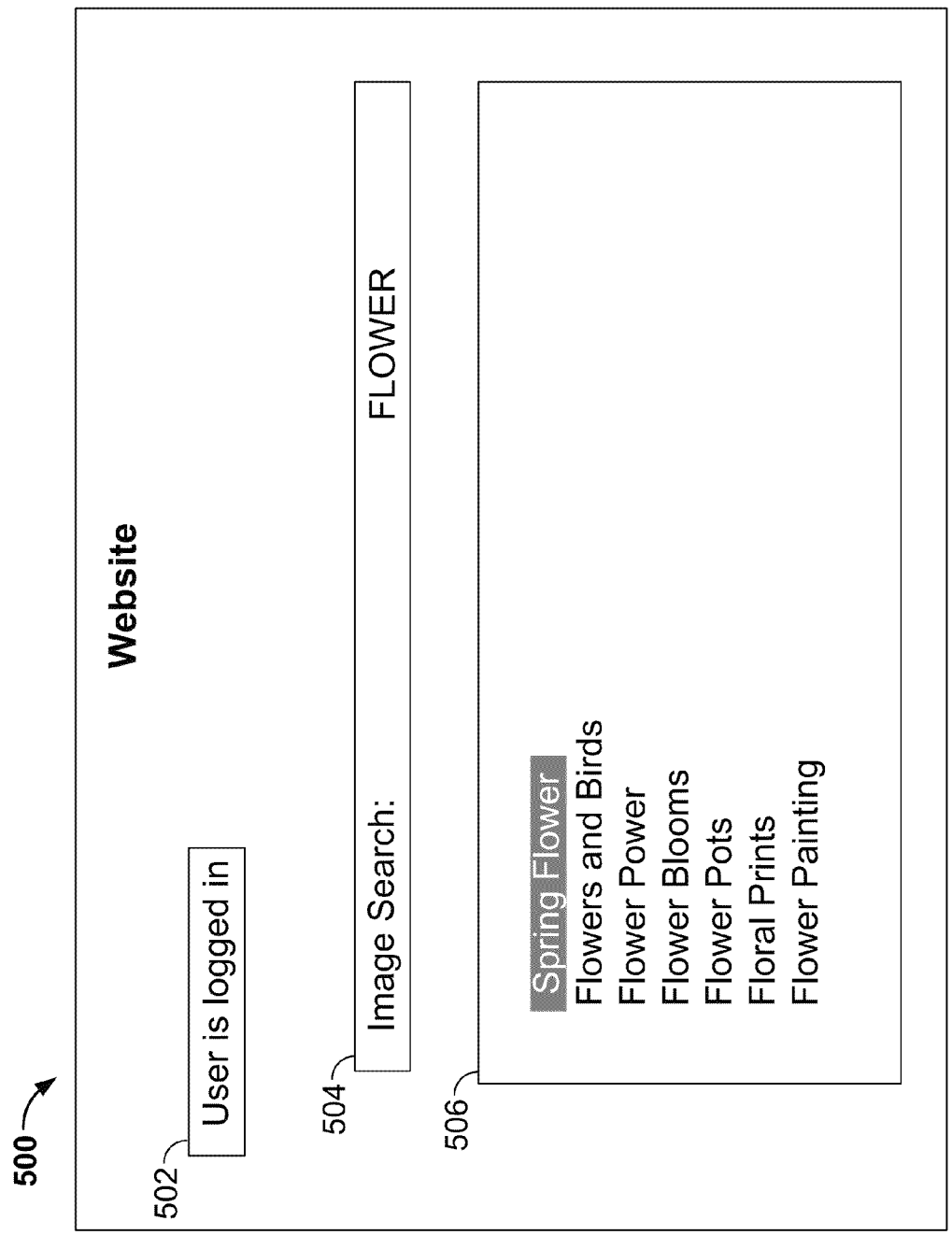
FIG. 5 shows an interface for selecting an image file in accordance with an embodiment.

However, if attempts at logging into the service fail, and image file service 130 is unable to authenticate the user, the user will not receive the key. Therefore, even if the user is able to acquire an encrypted image file, the user cannot decrypt the image file. Should a user attempt to view the encrypted image file (after performing decoding of the encrypted image file), the user is provided with a visual representation 700 of the image file, shown in FIG. 7. A user may perform a keyword search to acquire the image file. Details regarding a process of a user logging in to image file service 130 and performing a keyword search for an image file are described herein with respect to FIG. 5. FIG. 5 is discussed in greater detail below.

In an embodiment, the key in step 404 of the flowchart is a unique key associated with the request for the image file. In an embodiment, the key may be associated with a user device and/or user account. For example, user device 160-A may request JPEG image file A 360. Image file service 130 may associate key A 355 with user device 160-A. Therefore, encryption of the image file is performed by image file service 130 on a per-user basis.

Similarly, user device 160-B may request JPEG image file A 360 by sending a second request for JPEG image file A 360 to image file service 130. Image file service 130 receives the second request for JPEG image file A 360. Image file service 130 retrieves JPEG image file A 360, in response to receiving the second request for JPEG image file A 360. Image file service 130 may associate a second key, key B 356, with user device 160-B. Therefore, key B 356, different from key A 355, associated with JPEG image file A 360 is determined by image file service 130. Key B 356 is a unique key associated with the second request for JPEG image file A 360. Encryption module 330 in image file service 130 encrypts the predetermined number of bytes within the header using key B 356, starting at the beginning of the Huffman table chunk in DHT marker 610 to generate a second encrypted image file. The predetermined number of bytes are encrypted by encryption module 330 using key B 356. The predetermined number of bytes are encrypted in real-time by encryption module 330 in response to receiving the second request. The second encrypted image file may be visibly substantially similar to visual representation 700 of the encrypted image file or may be visibly different than the encrypted image file. The second encrypted image file is then transmitted to user device 160-B. When the image file is decrypted, however, the decrypted image file is the same, regardless of which key is used for encryption or which user device receives the image file.

In an alternate embodiment, key C 357 may be a public key used to encrypt the predetermined number of bytes. Image file service 130 may use an asymmetric encryption algorithm such as a public/private key algorithm, to encrypt the predetermined number of bytes. Using the asymmetric encryption algorithm, when a user employing user device 160 has logged in and/or has been authenticated, user device 160 transmits key C 357 (which may be stored in memory 235) to image file service 130. Image file service 130 then uses key C 357 to uniquely encrypt the image file requested by user device 160 in such a way that only device 160, which has a private key (which may be stored in memory 235) associated with key C 357, is able to decrypt the image file. Each user and/or user device possessing a private key may transmit public keys to image file service 130. Other encryption schemes may be used for encryption/decryption of the header in the JPEG image file.

Each user device (and/or user account) may receive a unique key associated with each JPEG image request, each user, each session, per account, etc. In an embodiment, a key may be generated or assigned by image file service 130 to all images requested by the user device. In another embodiment, a separate key may be generated or assigned by image file service 130 to each image requested by the user device. However, two user devices may not share the unique key, as one user device cannot decrypt a JPEG image file using another user device's unique key. In this way, extra security may be provided as one user device having a key cannot share or transfer the unique key to another user device. Therefore, each user device and/or user account has one or more unique keys associated with it.

Without having the appropriate key needed for decrypting, the process of reversing or recovering the image file is difficult and practically impossible. By using the Huffman coding chunk, the chances of recovering the image file are minimal. This is because without having code that informs a browser how to interpret the bit sequences in the JPEG's main payload, the image file may not be recovered.

By performing encryption of a portion of the header in the image file, the speed of the process of encryption is fast. For speed purposes, in an embodiment, no decoding of the picture is involved.

In an embodiment, an encryption algorithm such as Twofish, Serpent, AES (Rijndael), Blowfish, CAST5, RC4, 3DES, IDEA, etc. is applied to the predetermined number of bytes within the header, starting at the beginning of Huffman table chunk in DHT marker 610. In an embodiment, the first thirty-two bytes of the Huffman table chunk are encrypted.

Arithmetic Coding Conditioning Chunk

In an embodiment, an arithmetic coding conditioning chunk in DAC marker 612 may be encrypted. Data included in DAC marker 612 (e.g. as indicated by " . . . ") is coded using arithmetic coding, another entropy-coding technique. Data included in DAC marker 612 may contain the initial set of symbol probabilities used by the arithmetic coder. This data may be encrypted by any of various encrypting techniques. Similar to the encryption starting at the beginning of the Huffman table chunk, the data in the arithmetic coding conditioning chunk may be encrypted. Additionally, the data included in DAC marker 612 may be tuned in a unique manner for an image file.

A JPEG image file may use one or more of a DHT or a DAC coding technique. If only a DHT coding technique is used, then the beginning of the Huffman table chunk is encrypted. If on the other hand, only a DAC coding technique is used, then the arithmetic coding conditioning chunk is encrypted, in a similar manner as the beginning of the Huffman table chunk is encrypted. If both DHT and DAC coding techniques are used then one or both of the beginning of the Huffman table chunk and arithmetic coding conditioning chunk is encrypted. In an embodiment, the predetermined number of bytes within the header includes an arithmetic coding condition chunk.

Decryption

Figure 8:
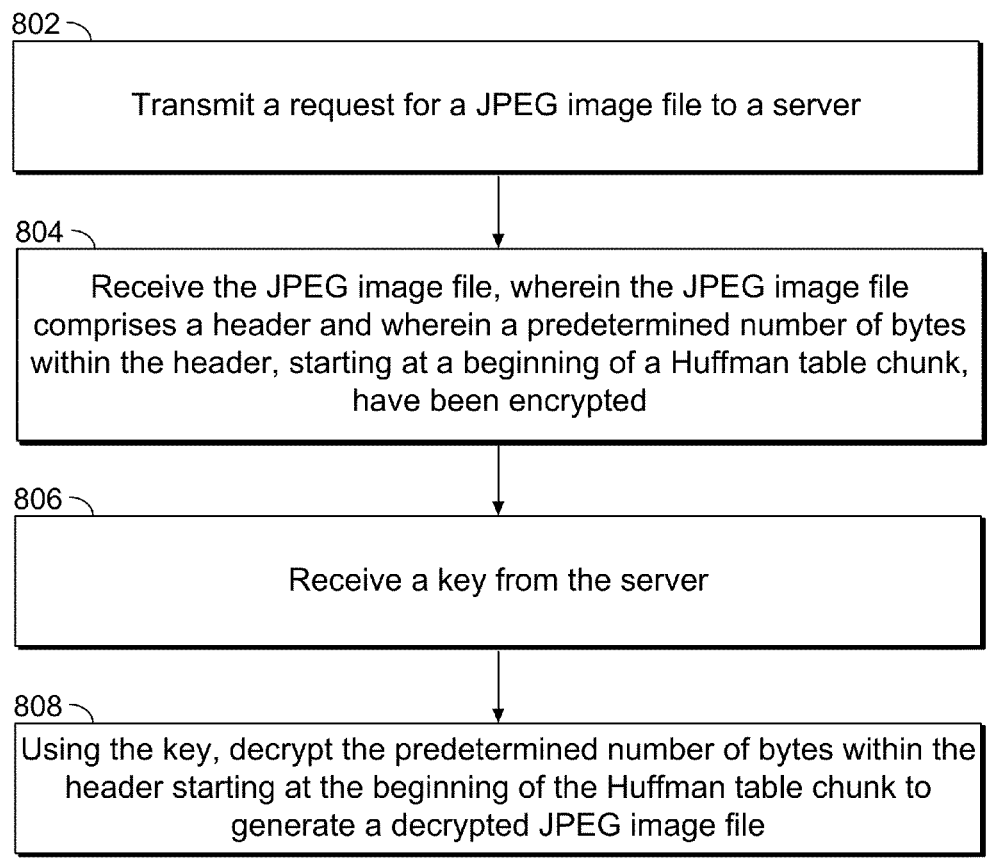
FIG. 8 is a flowchart for a method of decrypting an image file in accordance with an embodiment.

FIG. 8 is a flowchart for a method of decrypting an image file in accordance with an embodiment. At step 802, a request for a JPEG image file is transmitted to a server. User device 160 transmits a request for JPEG image file (JPEG image file A 360) to image file service 130, via network 105. Image file service 130 may comprise a server for receiving the request. Image file service 130 encrypts JPEG image file A in the manner described above, and transmits the encrypted file to user device 160.

At step 804, the JPEG image file is received. The JPEG image file comprises a header. A predetermined number of bytes within the header, starting at the beginning of a Huffman table chunk have been encrypted. The JPEG image file is received by user device 160 from image file service 130, via network 105. The JPEG image file comprises a header. A predetermined number of bytes within the header, starting at the beginning of Huffman table chunk in DHT marker 610 have been encrypted (by encryption module 330 in image file service 130, for example).

At step 806, a key is received from the server. User device 106 receives key A 355 from image file service 130, via network 105. As described above, key A 355 may be a unique key associated with user device 160.

Figure 9:
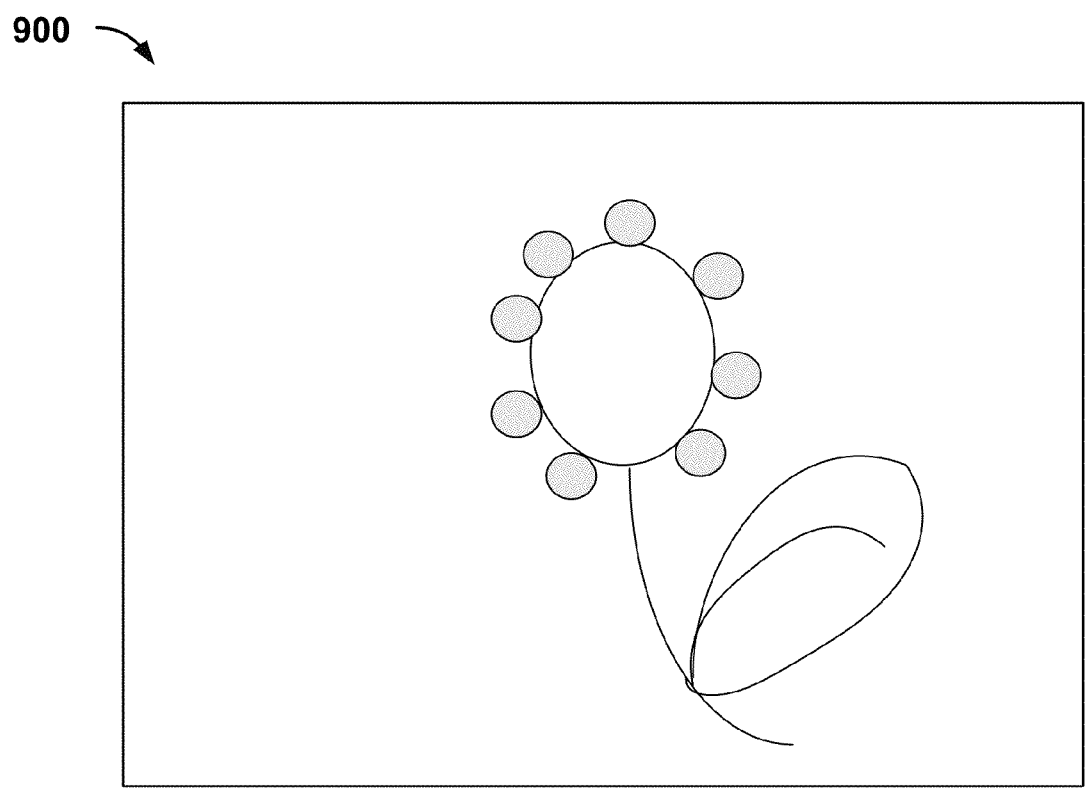
FIG. 9 shows a decrypted image file in accordance with an embodiment.

At step 808, using the key, the predetermined number of bytes within the header starting at the beginning of the Huffman table chunk are decrypted to generate a decrypted JPEG image file. User device 160 decrypts the predetermined number of bytes within the header, starting at the beginning of the Huffman table chunk in DHT marker 610 to generate a decrypted image file. A visual representation 900 of the decrypted image file may be displayed by user device 160, as shown in FIG. 9.

Suppose now that a user employing user device 160 wishes to search for an image file. The user may be provided with an interface 500, as shown in FIG. 5, for selecting an image file. Interface 500 may depict a webpage associated with a website, such as website 120. The user may log in to image file service 130. A user state indicator 502 may indicate that the user has successfully logged in, after an authentication of the user's credentials has been made by image file service 130. The user may type in the keyword "FLOWER" in a keyword search field 504. Search results 506 indicate the results of the search. Each of the search results may include a hyperlink, description, a corresponding miniature JPEG preview, etc. The user may use a mouse pointer, his/her finger, or other selection device and/or method to hover over the search results to receive additional information or a preview of the JPEG image file. In an embodiment, the user may select one or more of the search results. The selection may be made by clicking on a mouse, a keyboard, or other input device, hovering over a selection for a predetermined amount of time, or by selecting an area of a touch-screen enabled device.

The user may select the image for "Spring Flower." The user's device is provided with an encrypted version of image. The user's device then decrypts the image file to generate a decrypted image file. The user is then provided with visual representation 900 of the decrypted image file, shown in FIG. 9.

Visual representation 900 of the decrypted image file may be presented to the user, so that the user may view the JPEG image file on a display. In an embodiment, key A 355 is received from image file service 130 in response to successfully logging into the server. In an another embodiment, key A 355 may be a key which the user has stored on user device 160, and which is personal and uniquely associated with the login account on the server.

Figure 7:
FIG. 7 shows an encrypted image file in accordance with an embodiment.

However, should the user fail to supply proper credentials to image file service 130 or attempt to open a copy of the decrypted image file from a device not logged into image file service 130, the user may be provided with visual representation 700 depicting a scrambled or encrypted image, as shown in FIG. 7. Visual representation 700 of the encrypted image file (which has been decoded) would appear meaningless to the user and the user may not recover decrypted image file and view visual representation 900 of the decrypted image file unless the user obtains permission of image file service 130 (e.g. by supplying log in credentials, etc.). Should the user log in to image file service 130, the user may then be provided with the decrypted image file. Therefore, visual representation 900 of the decrypted image file may only be viewable by an authorized and/or approved user who has supplied proper credentials to image file service 130.

By performing decryption of a portion of the header in the image file, the speed of the process of decryption and/or deciphering is fast. For speed purposes, in an embodiment, it may not be necessary to perform full picture decoding by user device 160. All or portions of the decrypted image file may have been decoded by a JPEG decoder in user device 160. Specifically, decryption is performed using a JAVASCRIPT code running on browser 210. Once the image file has been decrypted or deciphered, the JPEG decoder receives the image file.

In an embodiment, a decryption algorithm such as Twofish, Serpent, AES (Rijndael), Blowfish, CAST5, RC4, 3DES, IDEA, etc. is applied to the predetermined number of bytes within the header, starting at the beginning of Huffman table chunk DHT marker 610 in order to decrypt the image file. User device 160 may decrypt the image file so that a user employing user device 160 can view, copy, access, modify, download, etc., the image file.

In an embodiment, should the arithmetic coding conditioning chunk be encrypted (in place of, or along with the Huffman coding chunk), the arithmetic coding chunk is decrypted in a similar manner as the Huffman coding chunk.

Watermarking

In accordance with another embodiment, a watermark is added to a stored JPEG image file by image file service 130. Adding a watermark to a JPEG image file offers advantages compared to existing watermarking methods. Existing methods of watermarking an image file require decoding a JPEG image file, watermarking the decoded image file, and re-encoding the watermarked JPEG image file prior to transmitting the file to a user. Avoiding the need to decode and subsequently re-encode an image file allows a JPEG image file to be watermarked in a less time-consuming manner, and requires fewer resources, than existing systems and methods.

Figure 10A:
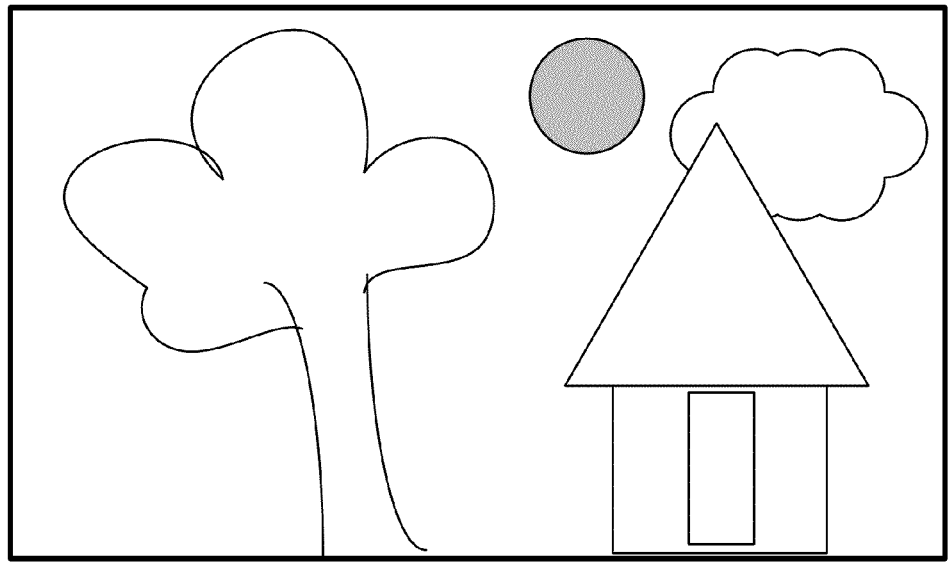
FIGS. 10A and 10B show an image and an associated JPEG image file in accordance with an embodiment.
Figure 10B:
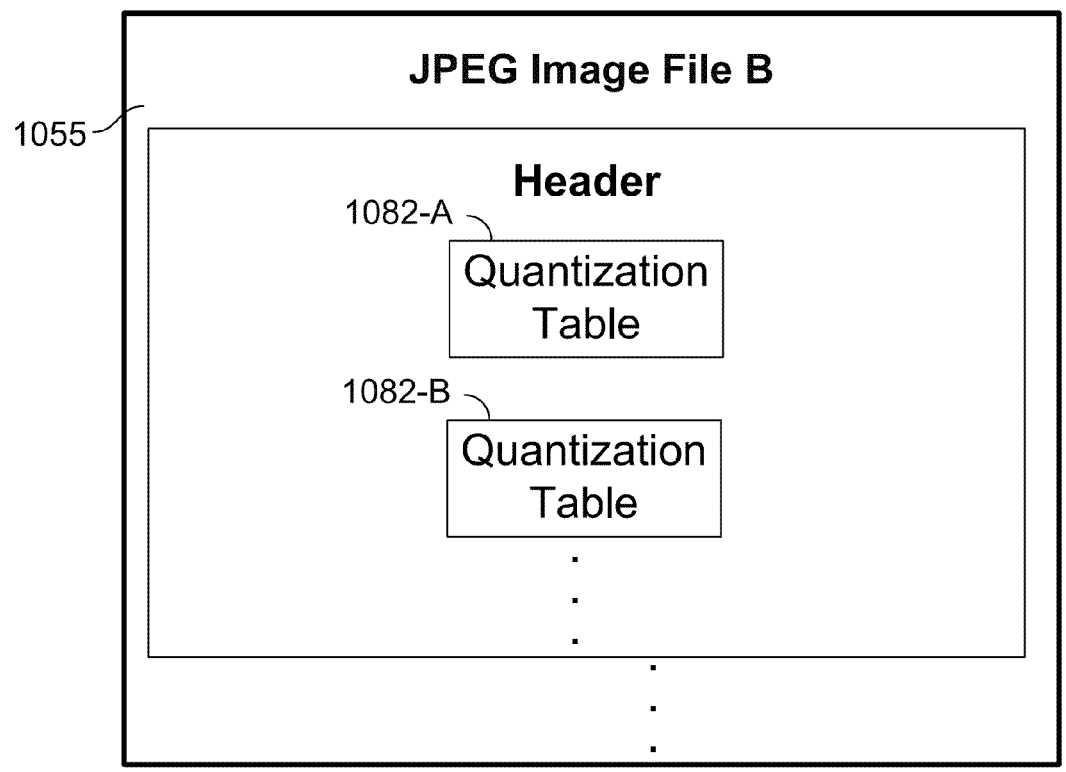

FIGS. 10A and 10B show an image 1000 and an associated JPEG image file B 1055. JPEG image file B 1055 comprises a header 1070, which includes one or more quantization tables 1082-A, 1082-B, etc. While two quantization tables 1082-A and 1082-B are shown, JPEG image file B 1055 may comprise more or fewer than two quantization tables. JPEG image file B 1055 is stored in memory 375, in JPEG image file library 370, in image file service 130, as shown in FIG. 3. JPEG image file B 1055 may include other tables, information, etc. not shown in FIG. 10B. In an embodiment, data within quantization table 1082-A is provided in the DQT of the structure of a JPEG image file. For example, the data is included within DQT marker 606.

In the illustrative embodiment of FIG. 10B, quantization table 1082-A is associated with a luminance channel and quantization table 1082-B is associated with a chrominance channel.

In accordance with an embodiment, when a request for an image file is received from a user device, the corresponding JPEG image file is identified and watermarked prior to transmission of the JPEG image file to the requesting user. The JPEG image file is watermarked on-the-fly, without the need for decoding and re-encoding.

Suppose, for example, that a request for JPEG image file B 1055 is received from user device 160. In response to the request, JPEG image file B 1055 is accessed and watermarked by watermark module 340 in image file service 130, without the need to decode and re-encode JPEG image file B 1055. After JPEG image file B 1055 is watermarked, JPEG image file B 1055 is transmitted to user device 160 by image file service 130.

Figure 11:
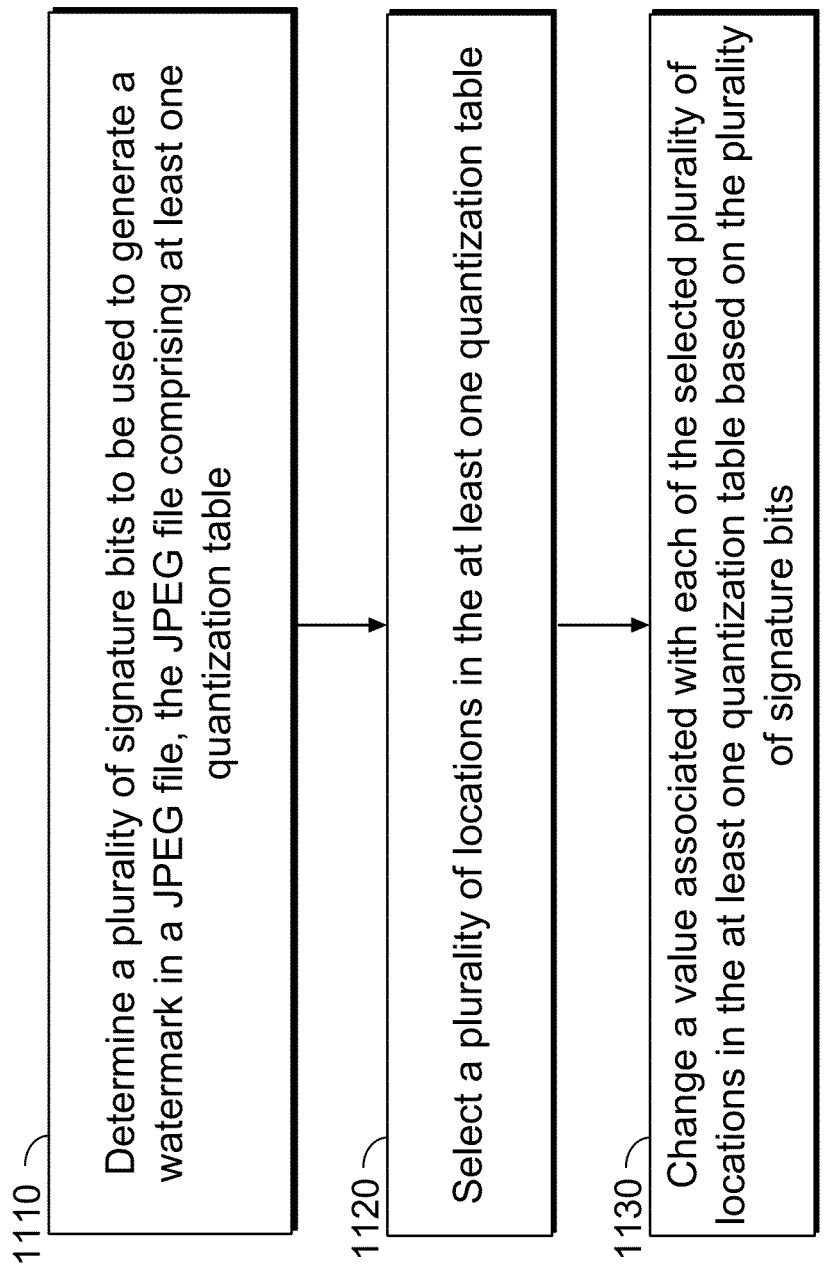
FIG. 11 shows a flowchart of a method of watermarking an encoded image file in accordance with an embodiment.

In accordance with an embodiment, watermarking of a JPEG image file is performed by modifying one or more quantization tables in the JPEG image file. FIG. 11 is a flowchart of a method of watermarking an encoded image file, in accordance with an embodiment. In one embodiment, both quantization tables 1082-A and 1082-B are modified. In other embodiments, a single quantization table may be modified. In other embodiments, more than two quantization tables may be modified.

At step 1110, a plurality of signature bits to be used to generate a watermark in a JPEG image file is determined, wherein the JPEG image file comprises at least one quantization table. In one embodiment, a plurality of signature bits are determined by generating a binary representation of a selected object. For example, a binary representation of a current date may be generated. In other embodiments, binary representations of other objects, such as a binary representation of a user identifier, a binary representation of an address, etc., may be used.

Figure 12:
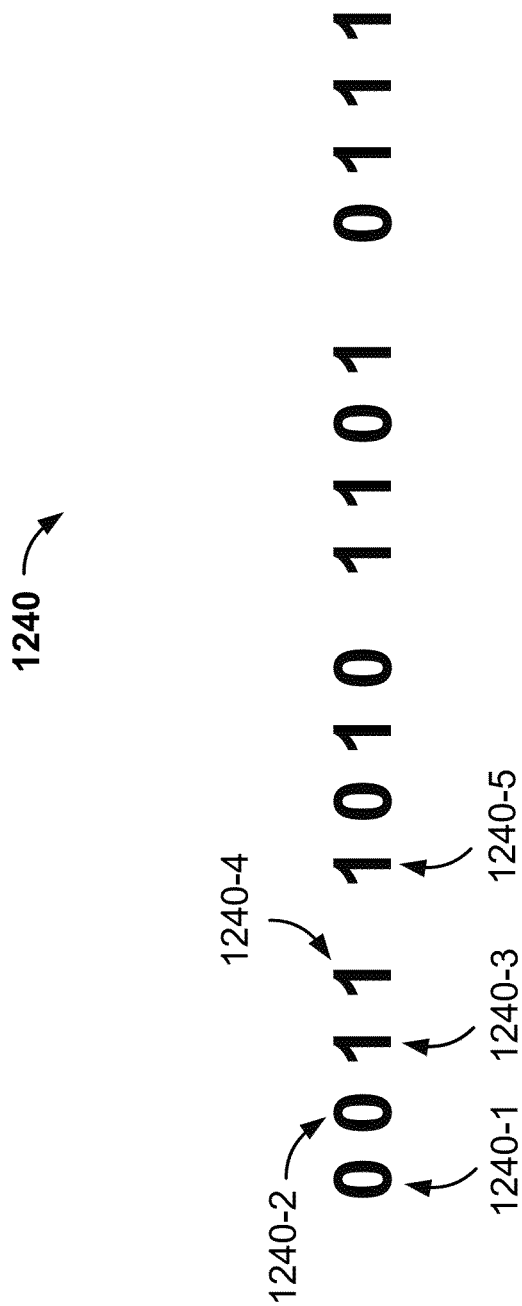
FIG. 12 shows a binary representation associated with a selected object in accordance with an embodiment.

FIG. 12 shows a binary representation 1240 associated with a selected object, which may be used to determine a plurality of signature bits for use in adding a watermark to JPEG image file B 1055. Binary representation 1240 comprises sixteen bits including first bit 1240-1, second bit 1240-2, third bit 1240-3, fourth bit 1240-4, fifth bit 1240-5, etc.

In the illustrative embodiment, a watermark is added to JPEG image file B 1055 by modifying a single quantization table in the image file based on the signature bits. The method steps described below are discussed with reference to quantization table 1082-A. However, in other embodiments, multiple quantization tables within a JPEG image file may be modified in a similar manner. For example, the same method steps described below may be subsequently used to modify quantization table 1082-B (and/or other tables).

Figure 13A:
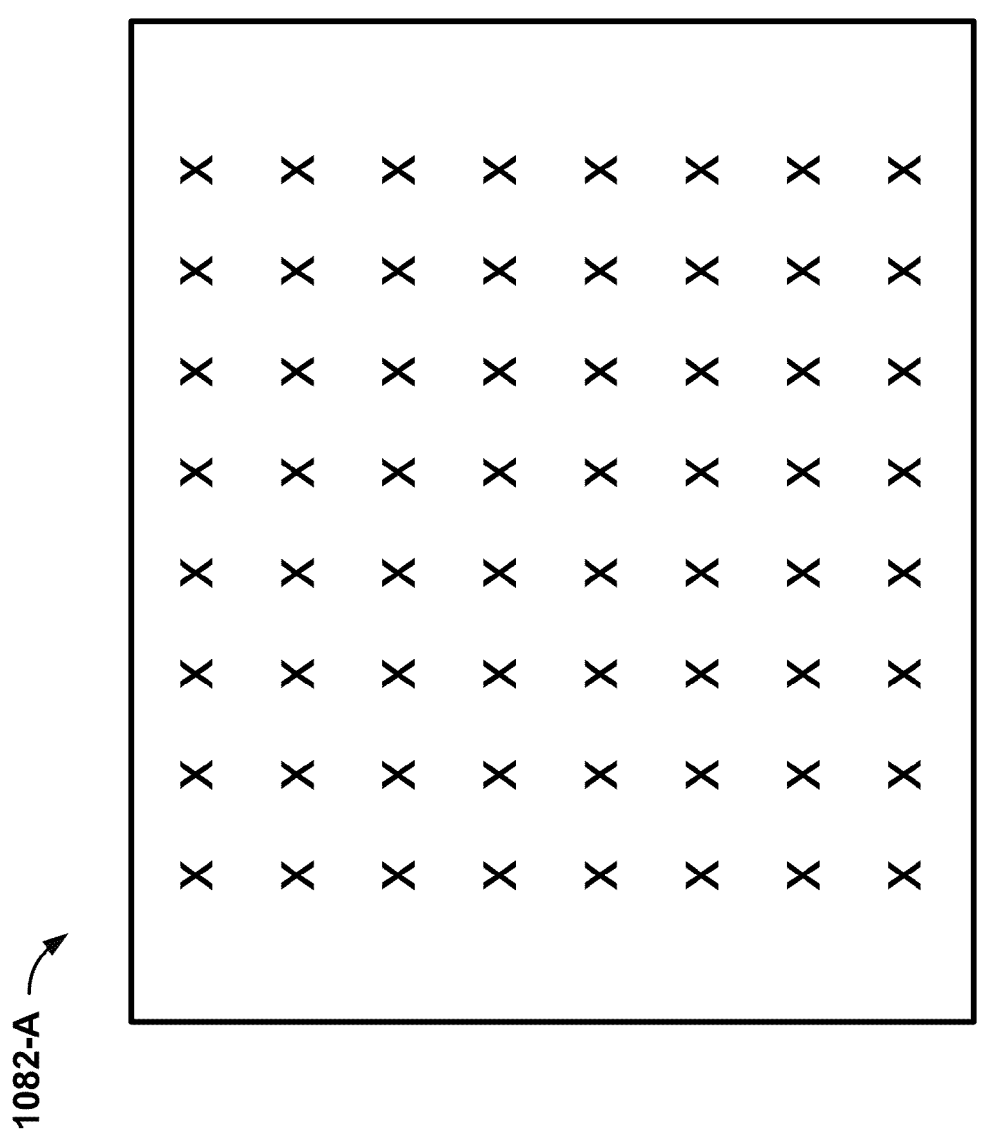

At step 1120, a plurality of locations in the at least one quantization table are selected. FIG. 13A shows an illustrative embodiment of quantization table 1082-A. Quantization table 1082-A comprises sixty-four locations arranged in eight rows and eight columns. Typically, each location in the quantization table stores a value, or coefficient.

In one embodiment, a plurality of locations associated with low frequencies are selected. Specifically, a plurality of locations associated with low frequency components of the signal are selected. For example, referring to FIG. 13B, sixteen locations 1305 (indicated by outline) in quantization table 1082-A, which are associated with low frequencies, are selected. In an embodiment, a plurality of locations may be associated with high frequency components of the signals.

Figure 13B:
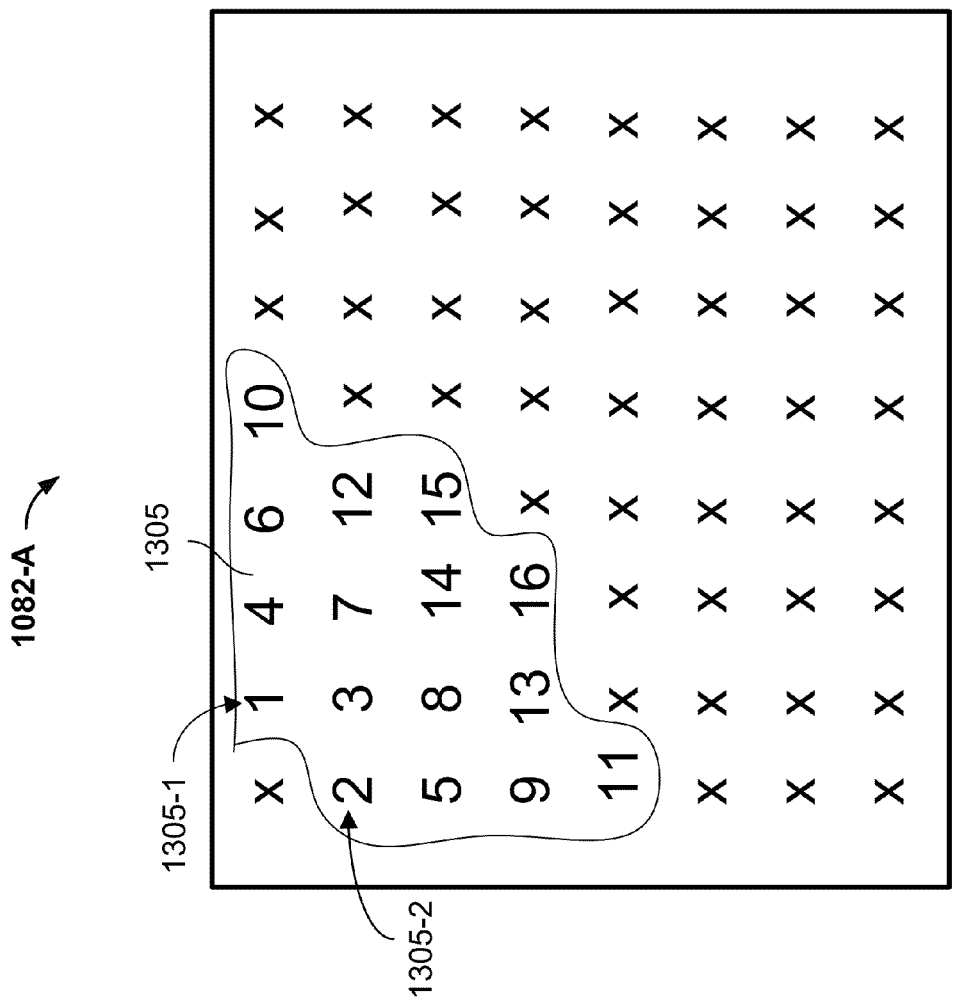
FIG. 13B shows locations in a quantization table which are associated with low frequencies in accordance with an embodiment.

In the illustrative embodiment of FIG. 13B, the sixteen locations 1305 are ordered numerically, one through sixteen. Thus, location 1305-1 is designated as location one, location 1305-2 is designated as location two, etc.

At step 1130, a value associated with each of the selected plurality of locations in the at least one quantization table is changed based on the plurality of signature bits. In the illustrative embodiment, for each of the selected plurality of locations, the associated value is modified in the following manner. A binary representation of the value is examined, and a bit in a selected position of the binary representation is changed, if necessary, to be equal to a corresponding bit in the plurality of signature bits. In one embodiment, the second least significant bit in the binary representation of the value is changed.

Figures 14A, 14B:
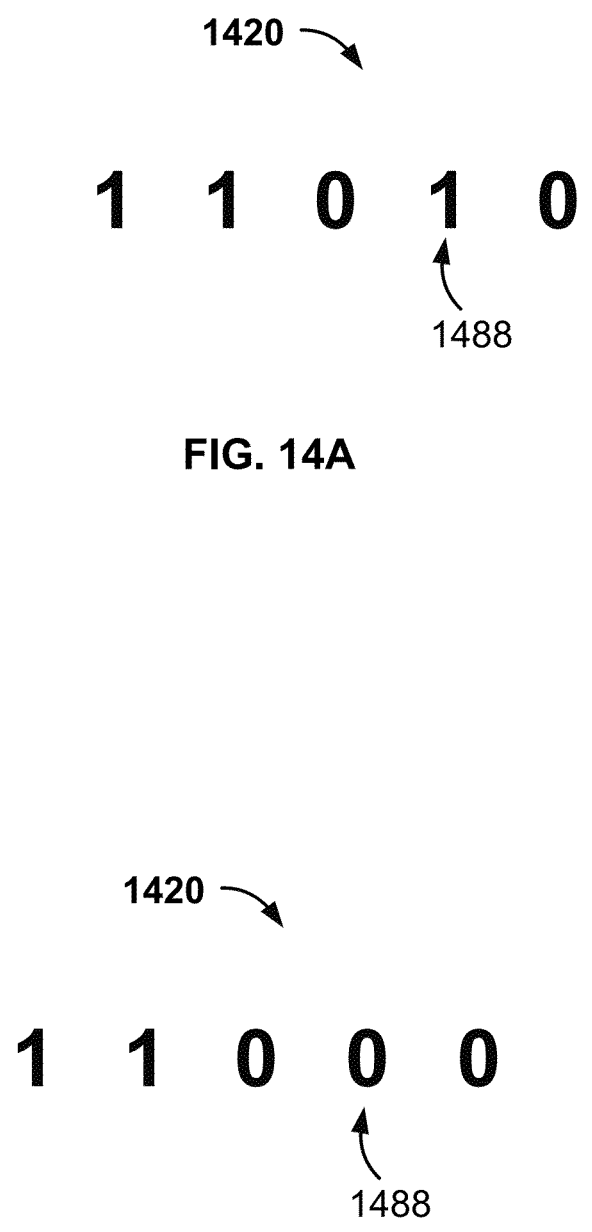

In an embodiment, the binary representation is stored in little-endien format and the second least significant bit corresponds to the second to last bit on the right. Suppose, for example, that a value stored in first location 1305-1 in quantization table 1082-A is expressed by the binary representation "11010" (1420) shown in FIG. 14A. Value 1420 includes a second least significant bit 1488, which is "1" in this instance. In accordance with the illustrative embodiment, second least significant bit 1488 of value 1420 is changed to be equal to first signature bit 1240-1, which is "0" (as shown in FIG. 12). Modified value 1420, in which second least significant bit 1488 has been changed to "0" is shown in FIG. 14B. In another embodiment, the binary representation may be stored in big-endien format.

The method described above is applied to the values in each of the sixteen locations 1305 in quantization table 1082-A. Thus, a value stored in second location 1305-2 is modified by changing a second least significant bit in the binary expression of the value to be equal to the second signature bit 1240-2, which is "0". If the second least significant bit in the binary expression of the value is already equal to the second signature bit, then no change is required. A value stored in third location 1305-2 is modified by changing a second least significant bit in the binary expression of the value to be equal to the third signature bit 1240-3, which is "1". If the second least significant bit in the binary expression of the respective value is already equal to the third signature bit, then no change is required. These steps are applied to the value stored at each of the sixteen locations 1305. In an embodiment, all of the second least significant bits are changed to equal the signature bit, regardless of whether or not the second least significant bit matches the signature bit.

In one embodiment, thirty-two signature bits are determined. For example, a thirty-two bit binary representation of a selected object may be determined. The first sixteen signature bits are used to modify quantization table 1082-A, in the manner described above, and a second sixteen signature bits are used to modify quantization table 1082-B, in the manner described above. In other embodiments, any number of signature bits may be determined and used.

Figure 15:
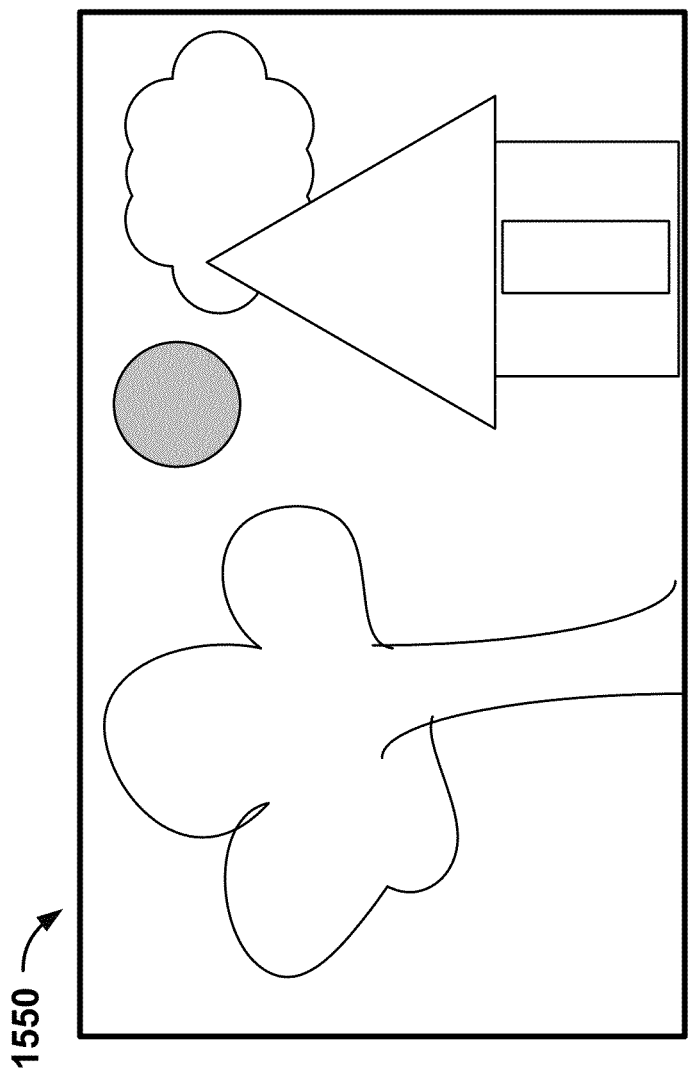
FIG. 15 shows an image resulting from a modified, watermarked JPEG image file in accordance with an embodiment.

After the quantization table(s) in the JPEG image file B 1055 are modified, the modified quantization tables are applied to the payload of JPEG image file B 1055. More specifically, encoded Fourier coefficients in the payload are re-quantized. The resulting, watermarked, JPEG image file B 1055 may be stored or transmitted to a requesting user. FIG. 15 shows an image resulting from modified, watermarked JPEG image file B 1055. In the illustrative embodiment, the resulting watermarked image 1550 appears identical, or substantially identical, to original image 1000 (shown in FIG. 10A). Any artifacts resulting from the watermark are imperceptible, or substantially imperceptible, to the human eye.

The methods and systems described above for adding a watermark to a JPEG image file may be used on-the-fly, in response to a request for an image file. For example, supposing that a user employing user device 160-A wishes to view image file 1055, and transmits a request to access the image file. User device 160-A accordingly transmits a request to image file service 130 to access JPEG image file B 1055. In response, image file service 130 may instruct watermark module 340 to add a watermark to JPEG image file B 1055. In response, watermark module 340 adds a watermark to JPEG image file B 1055, in the manner described above. Image file service 130 may then provide JPEG image file B 1055 to user device 160, or allow user device 160 to access JPEG image file B 1055.

Alternatively, watermark module 340 may function as a background routine and add watermarks to a plurality of image files stored in memory 325.

In various embodiments, the method steps described herein, including the method steps described in FIGS. 4, 8, and 11, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIGS. 4, 8, and 11. Certain steps of the methods described herein, including one or more of the steps of FIGS. 4, 8, and 11, may be performed by a server or by another processor in a network-based cloud-computing system. Certain steps of the methods described herein, including one or more of the steps of FIGS. 4, 8, and 11, may be performed by a client computer in a network-based cloud computing system. The steps of the methods described herein, including one or more of the steps of FIGS. 4, 8, and 11, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 4, 8, and 11, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 16:
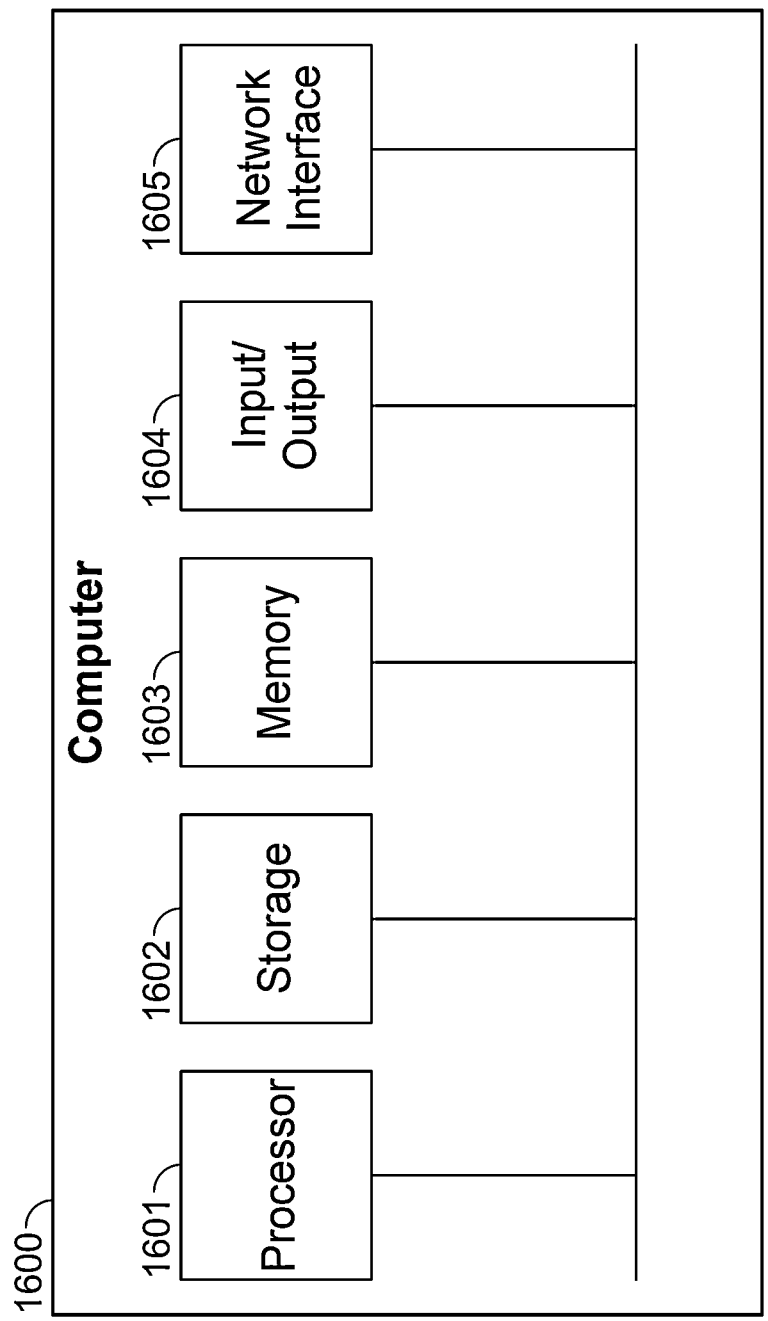
FIG. 16 illustratively depicts components of a computer that may be used to implement the invention.

FIG. 16 is a high-level block diagram of an exemplary computer that may be used for implementing recursive embedding by URL parameterization. Computer 1600 comprises a processor 1601 operatively coupled to a data storage device 1602 and a memory 1603. Processor 1601 controls the overall operation of computer 1600 by executing computer program instructions that define such operations. The computer program instructions may be stored in data storage device 1602, or other computer readable medium, and loaded into memory 1603 when execution of the computer program instructions is desired. Thus, the method steps of FIGS. 4, 8, and 11 can be defined by the computer program instructions stored in memory 1603 and/or data storage device 1602 and controlled by processor 1601 executing the computer program instructions. For example, the computer program instructions can be implemented as computer executable code programmed by one skilled in the art to perform an algorithm defined by the method steps of FIGS. 4, 8, and 11. Accordingly, by executing the computer program instructions, the processor 1601 executes an algorithm defined by the method steps of FIGS. 4, 8, and 11. Computer 1600 also includes one or more network interfaces 1605 for communicating with other devices via a network. Computer 1600 also includes one or more input/output devices 1604 that enable user interaction with computer 1600 (e.g., display, keyboard, mouse, speakers, buttons, etc.).

Processor 1601 may include both general and special purpose microprocessors, and may be the sole processor or one of multiple processors of computer 1600. Processor 1601 may comprise one or more central processing units (CPUs), for example. Processor 1601, data storage device 1602, and/or memory 1603 may include, be supplemented by, or incorporated in, one or more application-specific integrated circuits (ASICs) and/or one or more field programmable gate arrays (FPGAs).

Data storage device 1602 and memory 1603 each comprise a tangible non-transitory computer readable storage medium. Data storage device 1602, and memory 1603, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1605 may include peripherals, such as a printer, scanner, display screen, etc. For example, input/output devices 1604 may include a display device such as a cathode ray tube (CRT), plasma or liquid crystal display (LCD) monitor for displaying information to the user, a keyboard, and a pointing device such as a mouse or a trackball by which the user can provide input to computer 1600.

Any or all of the systems and apparatus discussed herein, including image file service 130, and user device 160, and components thereof, including browser 210, display 270, memory 235, key A 355, processor 320, encryption module 330, watermark module 340, memory 375, JPEG image file library 370, JPEG image file A 360, JPEG image file B 1055, key A 355, key B, 356, and key C 357 may be implemented using a computer such as computer 1600.

One skilled in the art will recognize that an implementation of an actual computer or computer system may have other structures and may contain other components as well, and that FIG. 16 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of watermarking an encoded image, comprising:
    determining a plurality of signature bits to be used to generate a watermark in a JPEG image file, wherein the JPEG image file comprises a first quantization table and a second quantization table;
    selecting a first plurality of locations in the first quantization table and a second plurality of locations in the second quantization table; and
    changing respective values corresponding with each of the selected first and second plurality of locations in the first quantization table and the second quantization table, based on the plurality of signature bits.

2. The method of claim 1, wherein changing the respective value associated with each of the selected first and second plurality of locations comprises:
    changing a bit in a selected position of a binary representation of the respective value to be equal to a corresponding one of the plurality of signature bits.

3. The method of claim 2, wherein the first quantization table comprises a first set of values associated with low frequency components of a signal;
    wherein selecting the first plurality of locations in the quantization table further comprises:
    selecting locations in the first quantization table from among the first set of values associated with low frequency components of the signal.

4. The method of claim 2, wherein the selected position of the binary representation of the respective value comprises a second least significant bit of the binary representation of the respective value.

5. The method of claim 1, wherein the first quantization table and the second quantization table comprise a quantization table associated with a luminance channel and a quantization table associated with a chrominance channel.

6. The method of claim 5, wherein the first quantization table comprises the quantization table associated with the luminance channel and the second quantization table comprises the quantization table associated with the chrominance channel.

7. The method of claim 1, further comprising:
    re-quantizing one or more encoded Fourier coefficients in a payload of the JPEG image file, after the respective values associated with the selected plurality of locations in a respective quantization table are changed.

8. A non-transitory computer readable medium having program instructions stored thereon, that, in response to execution by a computing device, cause the computing device to perform operations comprising:
    determining a plurality of signature bits to be used to generate a watermark in a JPEG image file, wherein the JPEG image file comprises a first quantization table and a second quantization table;
    selecting a first plurality of locations in the first quantization table and a second plurality of locations in the second quantization table;
    changing respective values corresponding with each of the selected first and second plurality of locations in the first quantization table and the second quantization table, based on the plurality of signature bits.

9. The non-transitory computer readable medium of claim 8, wherein changing a respective value associated with each of the first and second selected plurality of locations comprises:
    changing a bit in a selected position of a binary representation of the respective value to be equal to a corresponding one of the plurality of signature bits.

10. The non-transitory computer readable medium of claim 9, wherein the plurality of signature bits comprises one of: a binary representation of a date, a binary representation of a user identifier, and a binary representation of an address.

11. The non-transitory computer readable medium of claim 10, wherein the selected position of the binary representation of the respective value comprises a second least significant bit of the binary representation of the respective value.

12. The non-transitory computer readable medium of claim 9, wherein the first quantization table comprises a quantization table associated with a luminance channel and the second quantization table comprises a quantization table associated with a chrominance channel.

13. The non-transitory computer readable medium of claim 9, wherein the first quantization table comprises a first set of values associated with low frequency components of a signal;
    wherein selecting the first plurality of locations in the first quantization table further comprises:
    selecting locations in the first quantization table from among the first set of values associated with low frequency components of the signal.

14. The non-transitory computer readable medium of claim 8, wherein the operations further comprise:
    re-quantizing one or more encoded Fourier coefficients in a payload of the JPEG image file, after the respective values associated with the selected plurality of locations in a respective quantization table are changed.

15. A system for watermarking an encoded image, comprising:
    a memory configured to store an JPEG image file;
    a processor configured to:
        determine a plurality of signature bits to be used to generate a watermark in the JPEG image file, wherein the JPEG image file comprises a first quantization table and a second quantization table;
        select a first plurality of locations in the first quantization table and a second plurality of locations in the second quantization table;
        change respective values corresponding with each of the selected first and second plurality of locations in the first quantization table and the second quantization table, based on the plurality of signature bits.

16. The system of claim 15, wherein the processor is further configured to:
    change a bit in a selected position of a binary representation of the respective value to be equal to a corresponding one of the plurality of signature bits.

* * * * *